United States Patent [19]

Reichmann et al.

[11] Patent Number: 4,582,658

[45] Date of Patent: Apr. 15, 1986

[54] PROCESS FOR THE PRODUCTION OF A CELLULAR COMPOSITE PLASTIC PART

[75] Inventors: Wolfgang Reichmann, Hilden; Ulrich Knipp, Bergisch Gladbach; Adolf Richartz, Cologne; Walter Schneider, Overath, all of Fed. Rep. of Germany

[73] Assignee: Bayer Aktiengesellschaft, Bayerwerk, Fed. Rep. of Germany

[21] Appl. No.: 633,737

[22] Filed: Jul. 23, 1984

Related U.S. Application Data

[63] Continuation-in-part of Ser. No. 491,674, May 5, 1983, abandoned.

[30] Foreign Application Priority Data

May 19, 1982 [DE] Fed. Rep. of Germany ....... 3219040

[51] Int. Cl.⁴ .............................................. B29C 67/22
[52] U.S. Cl. .................................. 264/45.1; 264/46.4; 264/255; 264/300; 264/DIG. 83
[58] Field of Search ............. 264/45.1, DIG. 83, 300, 264/46.4, 255

[56] References Cited

U.S. PATENT DOCUMENTS

| | | | |
|---|---|---|---|
| 3,954,926 | 5/1976 | Pahl et al. ......................... | 264/46.4 |
| 4,058,492 | 11/1977 | von Bonin et al. .............. | 264/300 X |
| 4,081,578 | 3/1978 | Essen et al. ...................... | 428/63 |
| 4,220,727 | 9/1980 | Godlewski ...................... | 264/300 X |
| 4,254,228 | 3/1981 | Kleimann et al. .............. | 264/300 X |
| 4,487,912 | 12/1984 | Zimmerman et al. .......... | 264/300 X |

Primary Examiner—Philip Anderson
Attorney, Agent, or Firm—Gene Harsh; Joseph C. Gil

[57] ABSTRACT

A first reaction mixture, prepared from (a) isocyanates with isocyanate contents of from 5 to 50% and (b) compounds with molecular weights of from 32 to 10,000 which contain at least two isocyanate-reactive hydrogen atoms, in an equivalent ratio of component "a" to component "b" of 0.8:1 to 5:1, from 0.1 to 20% of a blowing agent and, optionally, other known additives, is introduced into the rigid cavity of a closed mold. After this mixture has become resistant to permeation, but is still compressible, a second reaction mixture, either the same or different from the first reaction mixture, prepared from (c) isocyanates having isocyanate contents of from 5 to 50% and (d) compounds with molecular weights of from 32 to 10,000 which contain at least two isocyanate-reactive hydrogen atoms, in an equivalent ratio of component "c" to component "d" of from 0.8:1 to 5:1, specific internal mold release agents and optionally blowing agents and other additives, is introduced into the mold, such that it surrounds the first mixture and compresses it. A third, optional, reaction mixture, the same as or different from the second mixture, may also be employed in a manner similar to the introduction of the second mixture. The final composite plastic part releases smoothly from the mold.

13 Claims, 1 Drawing Figure

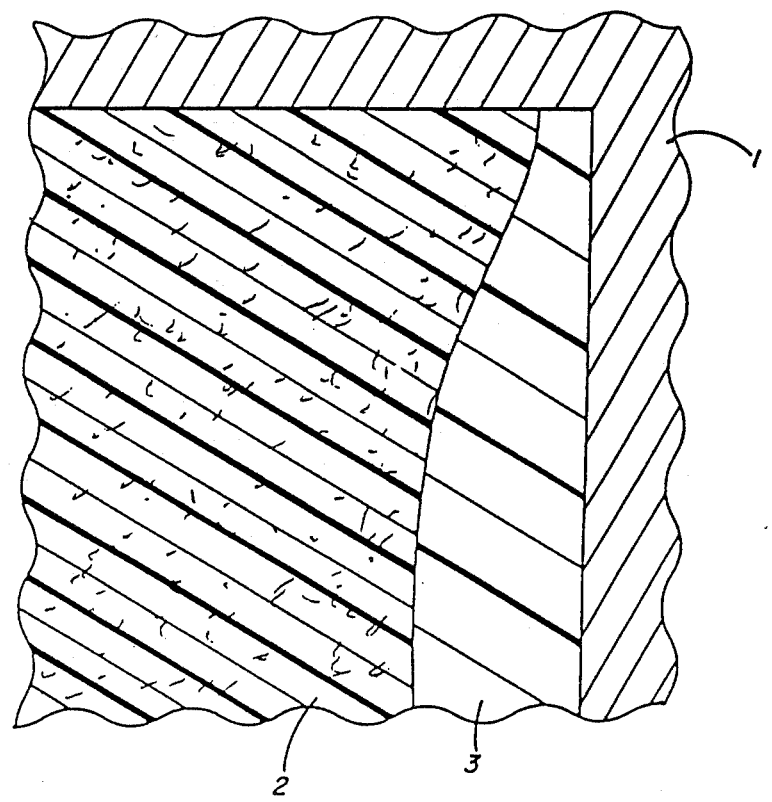

PROCESS FOR THE PRODUCTION OF A CELLULAR COMPOSITE PLASTIC PART

RELATED APPLICATION

This application is a continuation-in-part of U.S. application Ser. No. 491,674, filed May 5, 1983 now abandoned.

This invention relates to a process for the production of a composite part of cellular plastic which contains urethane and/or isocyanurate groups by the successive introduction of two or more reaction mixtures into a closed mold having a rigid cavity.

BACKGROUND OF THE INVENTION

Processes for the production of composite plastic parts which have cellular cores and solid cover layers are already known.

German Auslegeschrift No. 2,127,582 describes a process which results in cellular composite parts having compact, defect-free surfaces, by successively introducing several starting substances into a closed mold with a rigid cavity. In this process, at least one foamable and either a second foamable or a nonfoamable plastic charge is used, with the second charge compressing the first charge and forming the surface of the composite part. The timing of successive charges is selected in order that the second charge does not penetrate the first charge, but rather compresses it (depending on its mass and volume), and forms a good chemophysical bond with the first, because the first charge is not yet fully reacted and has still a sufficient tackiness and is still compressible. Consequently, the introduction of a plastics material containing a blowing agent into a plastic material which does not contain a blowing agent is no longer necessary for the production of a composite plastics article and neither is the expandable mold cavity (see German Auslegeschrift No. 2,442,227).

German Auslegeschrift No. 2,127,582 also particularly describes, in three embodiments, combinations of polyurethanes of a varying structure and hardness, as well as combinations of polyurethanes with other polymerization and polycondensation plastics. These embodiments, however, are restricted to a description of the procedure for filling the cavity of the mold, during which operation, the number and relative position of mixing heads used may vary. There are no details, in the very detailed description of the process of the reference, concerning the release from the mold of the composite plastics part. It is merely stated that the composite part, consisting of the first and second charges, has the shape and dimensions of the mold cavity, and that the composite part is removed from the mold after shaping.

However, it has now been found that during the production of composite parts from combinations of cellular polyurethane plastics, according to the teaching of German Auslegeschrift No. 2,127,582, it is only possible to release the composite part from the mold by damaging the part, as the surface of the part bonds to the surface of the cavity. Thus, composite parts, consisting of a first charge of a foamable polyurethane foam, which ought to simplify the release from the mold due to its hardness, and a second charge of a foamable or non-foamable polyurethane material, could not be removed from the mold without damaging the composite part.

Regardless of whether the second charge was a flexible, impact-resistant, semi-rigid, rigid, or very rigid, polyurethane plastic, a perfect release from the mold was impossible. Even in the case of a combination of a rigid polyurethane foam with a very rigid polyurethane as the second and outer layer (the combination which would be expected to be the most suitable), a smooth release could not be achieved.

The object of the present invention is to provide a process for the production of a composite part of cellular plastic containing urethane and/or isocyanurate groups, which does not have mold-release problems.

BRIEF DESCRIPTION OF THE DRAWING

The drawing illustrates the process of the present invention.

DESCRIPTION OF THE INVENTION

The present invention is directed to a process for the production of a composite part of cellular plastic which contains urethane and/or isocyanurate groups, by the successive introduction of two or more reaction mixtures into a closed mold having a rigid cavity, in which a first reaction mixture consisting of a foamable mixture has at least reached a condition which is resistant to penetration, but is still compressible, a second optionally-foamable reaction mixture is introduced into the mold, surrounding the first mixture and compressing it. After the second reaction mixture has become resistant to permeation, but is still compressible, a third reaction mixture may, optionally, be introduced into the rigid cavity, such that it surrounds the second mixture and compresses the composite of the first and second mixtures.

The process is more particularly characterized in that a first reaction mixture, comprising one or more isocyanates having isocyanate contents of from 5 to 50%, by weight; one or more compounds with molecular weights of from 32 to 10,000, which contain at least two isocyanate-reactive hydrogen atoms such that the equivalent ratio of isocyanates to compounds containing isocyanate-reactive hydrogen atoms is from 0.8:1 to 5:1; from 0.1 to 20%, preferably 0.1 to 10%, by weight (based on the reaction mixture), of a blowing agent comprising a compound which releases $CO_2$; and, optionally, an internal mold release agent, which may be used with an external mold release agent, or which may be completely replaced by an external mold release agent, and conventional auxiliary agents and additives, is introduced into the rigid cavity of a closed mold. After this first reaction mixture has at least become resistant to permeation, but is still compressible, a second reaction mixture is introduced into the cavity, such that the second mixture surrounds the first mixture and compresses it, this second mixture being the same as or different from the first reaction mixture. This second mixture comprises isocyanates having isocyanate contents of from 5 to 50%, by weight; one or more compounds with molecular weights of from 32 to 10,000, which contain at least two isocyanate-reactive hydrogen atoms, such that the equivalent ratio of isocyanates to compounds containing isocyanate-reactive hydrogen atoms is from 0.8:1 to 5:1; an internal mold release agent comprising a mixture of salts which contain at least 25 carbon atoms of aliphatic carboxylic acids, and optionally, amines containing amide and/or ester groups; esters, which contain COOH and/or OH groups, of mono- and/or polyfunctional carboxylic acids; and optionally, natural and/or synthetic oils, fats or waxes; and, optionally, blowing agents and/or conventional auxiliary agents and additives. Optionally, a third reaction mixture, either the same as or different from either the first or second mixture and comprising members from the same groups as comprise the second mixture, may be introduced into the rigid cavity after the second mixture has become resistant to permeation, but is still compressible, such that the third mixture surrounds the second mixture and compresses the composite of the first and second mixtures.

To ensure the optimum adhesion between the first (core) mixture and the second mixture, part of the external mold release agent which may be used in the first charging procedure, and which passes onto the core surface, is allowed to penetrate into the core itself by regulating the surface porosity of the core by adjusting the $CO_2$ which evolves during the first charging procedure. The part of the external mold release agent which remains on the surface of the cavity promotes the release from the mold of the composite part. Additionally, the reaction mixtures of subsequent charges, which may be identical to the reaction mixture of the first filling, contain specific internal mold release agents.

As the isocyanate component of the reaction mixtures to be used according to the present invention, aromatic polyisocyanates, as described, for example by W. Siefken in Justus Liebigs Annalen der Chemie, 562, pages 75 to 136, are preferred. Examples of these polyisocyanates include compounds corresponding to the formula,

$Q(NCO)_n$, wherein n=2 to 4, preferably 2, and

Q represents an aromatic hydrocarbon radical having from 6 to 15, preferably from 6 to 13, carbon atoms, for example, aromatic polyisocyanates of the type described in German Offenlegungsschrift No. 2,737,951, on pages 24 to 26.

The commercially-available polyisocyanates such as, for example 2,4- and 2,6-toluylene diisocyanate, and any mixtures of these isomers ("TDI") and polyphenyl polymethylene-polyisocyanates, as they are produced by aniline-formaldehyde condensation and by subsequent phosgenation ("crude MDI") are more preferable. Additional preferable isocyanates include polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-toluylene diisocyanate or from 4,4'- and/or 2,4'-diphenylmethane diisocyanate.

Suitable compounds which have at least two isocyanate-reactive hydrogen atoms and which have a molecular weight usually ranging from 400 to 10,000, include compounds containing amino groups, thiol groups, carboxyl groups, or preferably, hydroxyl groups, particularly compounds containing from 2 to 8 hydroxyl groups, specifically those of a molecular weight of from 1000 to 10,000, preferably from 2000 to 6000. Examples of such compounds include polyesters, polyethers, polythioethers, polyacetals, polycarbonates and polyester amides containing at least two, usually from 2 to 8, preferably from 2 to 4, hydroxyl groups, as they are known for the production of homogeneous and cellular polyurethanes. Such compounds are described, for example, in German Offenlegungsschrift No. 2,737,951 on pages 26 to 29.

Suitable polyhydroxyl compounds may also be modified before they are used in the polyisocyanate-polyaddition process. Thus, according to German Offenlegungsschriften Nos. 2,210,839 (U.S. Pat. Nos. 3,849,515) and 2,544,195, a mixture of polyhydroxyl compounds (for example, of polyether and polyester polyols) may be condensed into a relatively high molecular weight polyol by etherification in the presence of a strong acid. It is also possible, for example, according to German Offenlegungsschrift No. 2,559,372, to introduce amide groups into the polyhydroxyl compounds or, according to German Offenlegungsschrift No. 2,620,487, to introduce triazine groups into the polyhydroxyl compounds by a reaction with polyfunctional cyanuric acid esters. By reacting a polyol with less than an equivalent quantity of a diisocyanato carbodiimide and by the subsequent reaction of the carbodiimide group with an amine, amide, phosphite or a carboxylic acid, polyhydroxyl compounds containing guanidine, phosphonoformamidine or acylurea groups are obtained (German Offenlegungsschriften Nos. 2,714,289; 2,714,292 and 2,714,293).

In some cases, it is of particular interest to completely or partly convert the relatively high molecular weight polyhydroxyl compounds into the corresponding anthranilic acid esters by a reaction with isatoic acid anhydride, as is described in German Offenlegungsschriften Nos. 2,019,432 and 2,619,840 or in U.S. Pat. Nos. 3,808,250; 2,975,428 and 4,016,143. In this manner, relatively high molecular weight compounds having terminal aromatic amino groups are obtained. According to German Offenlegungsschrift No. 2,546,536, or U.S. Pat. No. 3,865,791, relatively high molecular weight compounds containing terminal amino groups are also obtained by reacting NCO prepolymers with enamines, aldimines and ketimines containing hydroxyl groups, and by subsequent hydrolysis. Other production processes for relatively high molecular weight compounds having terminal amino groups or hydrazide groups are described in German Offenlegungsschrift No. 1,694,152 (U.S. Pat. No. 3,625,871).

According to the present invention, those polyhydroxyl compounds, which contain high molecular weight polyadducts or polycondensates or polymers in a finely dispersed or dissolved form (see, for example, German Offenlegungsschrift No. 2,737,951, page 31), may also be used. Polyhydroxyl compounds which are modified by vinyl polymers, as obtained, for example, by the polymerization of styrene and acrylonitrile in the presence of polyethers (U.S. Pat. Nos.3,383,351; 3,304,273; 3,523,093 and 3,110,695 and German Auslegeschrift No. 1,152,536) or polycarbonate polyols (German Pat. No. 1,769,795 and U.S. Pat. No. 3,637,909) are suitable for the present process. Additionally, plastics of a reduced flammability which are obtained by using polyether polyols have been modified according to German Offenlegungsschriften Nos. 2,442,101; 2,644,922 and 2,646,141, by graft polymerization with vinyl phosphonic acid esters, and optionally, acrylonitrile, methacrylonitrile, acrylamide, methacrylamide, or OH-functional acrylic or methacrylic acid esters may be used. Still other suitable polyhydroxyl compounds include those into which carboxyl groups have been introduced by radical graft polymerization using unsaturated carboxylic acids, and optionally other olefinically-unsaturated monomers (see, German Offenlegungsschriften Nos. 2,714,291; 2,739,620 and 2,654,746), particularly when they are combined with mineral fillers.

Examples of such suitable compounds are described, for example, in High Polymers, Volume XVI, "Polyurethanes, Chemistry and Technology", by Saunders-Frisch, Interscience Publishers, New York, London, Volume I, 1962, pages 32-42 and pages 44-54 and Volume II, 1964, pages 5-6, and 198-199, and in Kunststoff-Handbuch, Volume VII, Vieweg-Hochtlen, Carl-Hanser-Verlag, Munich, 1966, for example, on pages 45-71. Of course, mixtures of the above-mentioned compounds having at least two isocyanate-reactive hydrogen atoms and molecular weights of from 400 to 10,000, for example, mixtures of polyethers and polyesters, may also be used. In some cases, it is particularly advantageous to combine low-melting and high-melting polyhydroxyl compounds (German Offenlegungsschrift No. 2,706,297).

Other suitable compounds, according to this invention, are those which have at least two isocyanate-reactive hydrogen atoms and molecular weights of from 32 to 400. These compounds may also contain hydroxyl groups and/or amino groups and/or thiol groups and/or carboxyl groups, preferably hydroxyl groups and/or amino groups. Such preferred compounds are conventionally used as a chain-lengthening agent or as a cross-linking agent, and usually contain from 2 to 8, preferably from 2 to 4, isocyanate-reactive hydrogen atoms. Examples of such compounds are mentioned in German Offenlegungsschrift No. 2,737,951, on page 30. In this case as well, mixtures of compounds, which have at least two isocyanate-reactive hydrogen atoms and molecular weights of from 32 to 400, may be used.

Suitable low molecular weight polyols include mixtures of hydroxy aldehydes and hydroxy ketones ("formoses") or the polyhydric alcohols obtained therefrom by reduction ("formitols"), as they are produced in the auto-condensation of formaldehyde hydrate in the presence of metal compounds as catalyst and in the presence of compounds capable of endiol formation as cocatalyst (See German Offenlegungsschriften Nos. 2,639,084; 2,714,084; 2,714,104, 2,721,186; 2,738,154 and 2,738,512). To obtain plastics having an improved non-flammability, these formoses or formitols are advantageously used in combination wtih aminoplast formers and/or phosphites (see German Offenlegungsschriften Nos. 2,738,513 and 2,738,532).

Solutions of polyisocyanate-polyaddition products, in particular of polyurethane ureas containing ionic groups and/or solutions of polyhydrazodicarbonamides in either low or high molecular weight polyhydric alcohols, may also be used as a polyol component according to the present invention (German Offenlegungsschrift No. 2,638,759).

Other suitable chain-lengthening agents include 1-mercapto-3-aminopropane, optionally substituted amino acids, for example, glycine, alanine, valine, serine and lysine, and optionally, substituted dicarboxylic acids, for example succinic acid, adipic acid, phthalic acids, 4-hydroxy-phthalic acid and 4-aminophthalic acid.

Compounds which are monofunctional with respect to isocyanates may be simultaneously used, according to the instant invention, in quantities of from 0.01 to 10%, by weight, based on polyurethane solids, as so-called chain terminators. Examples of such monofunctional compounds include monoamines, such as butylamine and dibutylamine, octylamine, stearylamine, N-methylstearylamine, pyrrolidine, piperidine and cyclohexyl amine, monoalcohols such as butanol, 2-ethyl hexanol, octanol, dodecanol, the different amyl alcohols, cyclohexanol and ethylene glycol monoethyl ether.

Water and/or readily volatile organic or inorganic substances may be used, for example, as blowing agents to be optionally, and possibly simultaneously, used for the reaction mixture of the second and, optionally (if used) third reaction mixtures. Examples of suitable organic blowing agents include acetone, ethylacetate, halogen-substituted alkanes, such as methylene chloride, chloroform, ethylidene chloride, vinylidene chloride, monofluorotrichloromethane, chlorodifluoromethane, dichlorofluoromethane, butane, hexane, heptane and diethylether. Air, $CO_2$ and $N_2O$ are included, for example, as inorganic blowing agents.

A blowing effect may also be achieved by adding compounds which decompose at temperatures above room temperature with the release of gases, for example, nitrogen, such as azo compounds, for example, azodicarbonamide or azoisobutyric acid nitrile. Other examples of blowing agents and details concerning the use of blowing agents are described in Kunststoff-Handbuch, Volume VII, for example, on pages 108 and 109, 453, and 507-510.

Auxiliaries and additives which are conventional in polyurethane chemistry may also be added to the reaction mixtures to be used according to the present invention. Examples of such auxiliaries and additives include urethane and/or isocyanurate catalysts of the known type, for example, those which are described in German Offenlegungsschrift No. 2,737,951, pages 32 and 33. Other examples of catalysts to be used according to the present invention, and details about the action of the catalysts, are described in Kunststoff-Handbuch, Volume VII, for example, on pages 96-102. Normally, these catalysts are used in a quantity of from about 0.001 to 10%, by weight, based on the total quantity of compounds having at least two isocyanate-reactive hydrogen atoms.

Surface-active additives, such as emulsifiers and foam stabilizers, reaction retarders and other additives may also be simultaneously used (concerning all these additives, see German Offenlegungsschrift No. 2,737,951, page 34). Other examples of surface-active additives and foam stabilizers, optionally to be simultaneously used according to the present invention, as well as cell regulators, reaction retarders, stabilizers, flame-resistant substances, plasticizers, dyes, fillers and fungistatically- and bacteriostatically-active substances, and details concerning the use and effect of these additives, are described in Kunststoff-Handbuch, Volume VII, for example, on pages 103-113.

Internal mold release agents, which are frequently added to the first reaction mixture, and optionally to the second reaction mixture and optionally, if used, the third reaction mixture include those described, for example, in U.S. Pat. Nos. 3,726,952; 4,024,090; 4,033,912; 4,058,492; 4,098,731 and 4,588,537, German Offenlegungsschrift No. 2,307,589 and British Pat. No. 1,365,215.

The products of the instant process are used as, for example, construction parts in the motor vehicle, furniture, electronic device and phono sectors.

In the drawing, 1 represents the mold, 2 represents the first reaction mixture, while 3 represents the second reaction mixture.

The following examples are intended to demonstrate the instant invention without any way limiting it and all quantities and percentages are by weight, unless otherwise indicated.

EXAMPLES

In Examples 1 through 6 and Comparison Example 1, the following procedure was employed:

A first reaction mixture, selected from Formulations 1 through 6, was prepared from a polyol from Polyol Components 1 through 3 and 6, an isocyanate from Isocyanate Components 1 through 3, and a blowing agent from those listed, and introduced, using a high pressure dosing installation, into the cavity of a metal mold of 1650 cm$^3$ capacity which had been coated with an external mold release agent which has been dissolved in a suitable solvent. About one minute later, a second reaction mixture, a mixture selected from Formulations 6 through 9, prepared from a polyol from Polyol Components 4 through 7 and an isocyanate from Isocyanate Components 1, 3 or 4 was introduced into the mold using the high pressure dosing installation. After solidification of the composite part, the part was removed from the mold and observation on its release and measurement of its properties were made, as shown in Table 1.

For comparison, Formulation 1 was employed as the first reaction mixture and Formulation 7 was employed in the Comparison Example which was also prepared using the process described above.

6.9% of adipic acid/phthalic acid anhydride-oleic acid trimethylolpropane-polyester (OH number of 385) of Polyol Component 1, 2.1% of polyester of 6 mols of oleic acid, 1 mol of adipic acid, and 2.5 mols of pentaerythritol (OH number of 45), 0.4% of amine activator (Desmorapid ®DB of BAYER AG, Germany)

0.6% of polysiloxane-polyalkylene oxide polymer (stabilizer OS 50 of BAYER AG, Germany)

51.2% of aluminum hyroxide (Al(OH)$_3$), and

10% of ammonium-polyphosphate.

OH number: 186

Viscosity at 25° C.: 23,000 mPa's.

Polyol Component 3, consisting of:

43.1% of trimethylolpropane-propylene oxide adduct (OH number of 650), 26.0% of trimethylolpropane-propylene oxide adduct (OH number of 380), 2.8% of propylene oxide-ethylene oxide-polyether (82.5% PO; 17.5% EO) started on trimethylolpropane (OH number of 35), 19.3% of styrene-acrylonitrile-copolymer (styrene:acrylonitrile=1:4), 4.3% of oleate of 1 mol of oleic acid and 1 mol of an amine-amide (the amine-amide having been formed from 1 mol of oleic acid and 1 mol of 3-dimethylaminopropylamine-1), 1.6% of amine activator (Desmorapid ®VP PU 3144 of BAYER AG, Germany),

| Example | 1 | 2 | 3 | 4 | 5 | 6 | Comparative Example |
|---|---|---|---|---|---|---|---|
| Raw materials (first charge °C.) A(*)/B(**): | 32/28 | 27/28 | 28/29 | 48/41 | 47/40 | 28/29 | Comp. |
| temperature (second charge °C.) A(*)/B(**): | 46/47 | 43/44 | 42/45 | 38/44 | 42/47 | 40/41 | Table 1 |
| Mold temperature (°C.) | 64 | 67 | 69 | 70 | 65 | 67 | |
| Mixing pressure (bar) | 160 | 170 | 165 | 230 | 195 | 215 | |
| Molding time (min) | 5 | 5 | 5 | 4 | 6 | 7 | |

Acmosil ®, a sales product of ACMOS, Germany was used as external mold release agent.
(*) A = Polyol Component
(**) B = Isocyanate Component Polyol Component 1, consisting of:

43% of propylene oxide-polyether started on ethylene diamine (OH number of 630), 8.5% of trimethylol propane-propylene oxide adduct (OH number of 930), 27% of propylene oxide-ethylene oxide-polyether (75% PO, 25% EO) started on trimethylolpropane (OH number of 35), 17.5% of polyester of adipic acid (10%), phthalic acid anhydride (21%), oleic acid (20%), and trimethylolpropane (49%) (OH number of 385), 1.7% of oleate of 1 mol of oleic acid and 1 mol of an amine-amide (the amine-amide having been formed from 1 mol of oleic acid+1 mol of 3-dimethylaminopropylamine-1), and 2.3% of polysiloxane-polyalkylene oxide copolymer (1:1 mixture of stabilizers OS 50 and OS 720 of BAYER AG, Germany).

OH number: 427;

Viscosity at 25° C.: 6000 mPa's.

Polyol Component 2, consisting of:

28.8% of trimethylolpropane-ethylene oxide adduct (OH number of 550), 2.9% of polysiloxane-polyalkylene oxide copolymer (stabilizer mixture of Polyol Component 1).

OH number: 380;

Viscosity at 25° C.: 5600 mPa's.

Polyol Component 4 (comparison), consisting of:

57% of trimethylolpropane-propylene oxide adduct (OH number 875),

38% of propylene oxide/ethylene oxide polyether (70% PO; 30% EO) started on trimethylolpropane (OH number of 42), 3.6% of amine activator (1:1 mixture of Desmorapid DB and Desmorapid ®PV of BAYER AG, Germany), and 1.4% of polysiloxane-polyalkylene oxide copolymer (stabilizer OS 50 of BAYER AG, Germany)

OH number: 515;

Viscosity at 25° C.: 2000 mPa's.

Polyol Component 5, consisting of:

55.4% of propylene oxide-polyether started on ethylene diamine (OH number of 630), 37% of propylene oxide/ethylene oxide-polyether (75% PO; 25% EO) started on trimethylol propane (OH number of 35), 1% of amine activator (Desmorapid ®DB of BAYER AG, Germany)

1% of polysiloxane-polyalkylene oxide copolymer (stabilizer OS 50 of BAYER AG, Germany)

2.8% of oleate of 1 mol of oleic acid and 1 mol of amine-amide (the amine-amide having been formed from 1 mol of oleic acid and 1 mol of 3-dimethylamino-propylamine-1), and 2.8% of polyester of 6 mols of oleic acid, 1 mol of adipic acid, 2.5 mols of pentaerythritol (OH number of 50).

OH number: 365;

Viscosity at 25° C.: 2000 mPa's.

Polyol Component 6, consisting of:

34.5% of trimethylolpropane-propylene oxide adduct (OH number of 1030), 14.5% of propylene oxide-polyether started on ethylene diamine (OH number of 800), 36% of propylene oxide/ethylene oxide-polyether (85% PO, 15% EO) started on trimethylolpropane (OH number of 45), 1.7% of amine activator (Desmorapid ®DB of BAYER AG, Germany)

5% of oleate of 1 mol of oleic acid and 1 mol of amine-amide (the amine-amide having been formed from 1 mol of oleic acid and 1 mol of 3-dimethylamino-propylamine-1), 5% of polyricinoleic acid (average molecular weight of 1000), and 3.3% of polysiloxane-polyalkylene oxide copolymer (stabilizer OS 720 of BAYER AG, Germany)

OH number: 490;

Viscosity at 25° C.: 2000 mPa's

Polyol Component 7, consisting of:

86% of propylene oxide/ethylene oxide-polyether (83% PO; 17% EO) started on trimethylolpropane (OH number of 35), 10% of propylene oxide/ethylene oxide-polyether (87% PO; 13% EO) started on propylene glycol (OH number of 150), 2% of oleate of 1 mol of oleic acid and 1 mol of amine-amide (the amine-amide having been formed from 1 mol of oleic acid and 1 mol of 3-dimethylamino-propylamine-1), 1.75% of polyester of 6 mols of oleic acid, 1 mol of adipic acid, 2.5 mols of pentaerythritol (OH number of 50), and 0.25% of potassium acetate.

OH number: 46;

Viscosity at 25° C.: 850 mPa's

Isocyanate Component 1, consisting of:

Polyphenylpolymethylene polyisocyanate (crude MDI)

Isocyanate content: 31%

Viscosity at 25° C.: 130 mPa's

Isocyanate Component 2, consisting of:

39.5% of isocyanate component 1, 50.5% of aluminum hydroxide, 9.5% of ammonium polyphosphate, and 0.5% of sodium alumino silicate.

Isocyanate content: 7.5%;

Viscosity at 25° C.: 18,000 mPa's.

Isocyanate Component 3, consisting of:

75% of polyphenyl polymethylene polyisocyanate (isocyanate content 31%), and

25% of polyester of 6 mols of oleic acid, 1 mol of adipic acid, 2.5 mols of pentaerythritol (OH number 50).

Isocyanate content: 29%;

Viscosity at 25° C.: 140 mPa's.

Isocyanate Component 4, consisting of:

74% of polyphenyl polymethylene polyisocyanate (having a high 2-nuclear (63%) and a 2,4'-isomer proportion of about 3%), (isocyanate content 33%), 20% of propylene oxide/ethylene oxide-polyether (87% PO, 13% EO) started on propylene glycol (OH number of 150), and 6% of polypropylene glycol (OH number of 500).

Isocyanate content: 20%;

Viscosity at 25° C.: 750 mPa's.

Blowing Agents for the First Reaction Mixtures 0.6 and 1.2% of water (based on the polyol component) or 1% of pyrocarbonic acid diethyl or dimethylester (based on the isocyanate component) or 10% of isophthalic acid-bis-carbonic acid ethylesteranhydride (based on the isocyanate component).

Formulation 1:
100 parts, by weight, of polyol component 1
1.2 parts, by weight, of water
134 parts, by weight, of isocyanate component 1

Formulation 2:
100 parts, by weight, of polyol component 1
114 parts, by weight, of isocyanate component 1
1.2 parts, by weight, of pyrocarbonic acid dimethyl-ester Formulation 3:
100 parts, by weight, of polyol component 1
0.6 parts, by weight, of water
124 parts, by weight, of isocyanate component 1
13 parts, by weight, of isophthalic acid-bis-carbonic acid ethylester anhydride Formulation 4:
100 parts, by weight, of polyol component 2
1.2 parts, by weight, of water
175 parts, by weight, of isocyanate component 2

Formulation 5:
100 parts, by weight, of polyol component 3
1.2 parts, by weight, of water
120 parts, by weight, of isocyanate component 1

Formulation 6:
100 parts, by weight, of polyol component 6
1.2 parts, by weight, of water
159 parts, by weight, of isocyanate component 3

Formulation 7: (Comparison)
100 parts, by weight, of polyol component 4
137 parts, by weight, of isocyanate component 1

Formulation 8:
100 parts, by weight, of polyol component 5
100 parts, by weight, of isocyanate component 1

Formulation 9:
100 parts, by weight, of polyol component 6
139 parts, by weight, of isocyanate component 3

Formulation 10:
100 parts, by weight, of polyol component 7
250 parts, by weight, of isocyanate component 4

The results of Examples 1 through 6 and a Comparison Example are provided in Table 1.

TABLE 1

| Example | 1st mixture (core) | 2nd mixture (outer layer) | Average density of part (g/cm$^3$) | Release from the mold | Surface hardness (Shore D) | Surface quality | Characteristics |
|---|---|---|---|---|---|---|---|
| Comparison | Formulation 1 | Formulation 7 | 0.6 | Sticking & | — | — | — |

TABLE 1-continued

| Example | 1st mixture (core) | 2nd mixture (outer layer) | Average density of part (g/cm³) | Release from the mold | Surface hardness (Shore D) | Surface quality | Characteristics |
|---|---|---|---|---|---|---|---|
| | 594 g | 396 g | | composite part destroyed | | | |
| 1 | Formulation 1 495 g | Formulation 8 330 g | 0.5 | perfect | 83 | Mono-layer lacquering* | — |
| 2 | Formulation 4 594 g | Formulation 9 396 g | 0.6 | perfect | 83 | Mono-layer lacquering* | free from distortion with unilateral encasing |
| 3 | Formulation 6 495 g | Formulation 6 330 g | 0.5 | perfect | 83 | Mono-layer lacquering* | — |
| 4 | Formulation 2 | Formulation 8 | 0.5 | perfect | 83 | Mono-layer lacquering* | — |
| 5 | Formulation 3 594 g | Formulation 9 396 g | 0.6 | perfect | 83 | Mono-layer lacquering* | — |
| 6 | Formulation 5 594 g | Formulation 8 396 g | 0.6 | perfect | 83 | Mono-layer lacquering* | as Example 2 |

*This means, that the surface has such a high quality, that mono layer lacquering is possible without any other previous preparation of the surface.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a composite part of a cellular plastic containing urethane, isocyanurate, or urethane and isocyanurate groups by the successive introduction of reaction mixtures into a closed mold with a rigid cavity, such that the first mixture is foamable and is introduced into the cavity and allowed to cure until it is resistant to permeation, but is still compressible, and a second mixture is introduced into the cavity such that it surrounds the first mixture and compresses it, characterized in that (A) the first reaction mixture comprises isocyanates having isocyanate contents of from 5 to 50%, by weight, one or more compounds with molecular weights of from 32 to 10,000, which contain at least two isocyanate-reactive hydrogen atoms, such that the equivalent ratio of isocyanates to compounds containing isocyanate-reactive hydrogen atoms is from 0.8:1 to 5:1 and from 0.1 to 20%, by weight (based on the reaction mixture) of a blowing agent comprising a compound which releases $CO_2$; and
   (B) the second reaction mixture comprises isocyanates having isocyanate contents of from 10 to 50%, by weight, one or more compounds with molecular weights of from 32 to 10,000, which contain at least two isocyanate-reactive hydrogen atoms, such that the equivalent ratio of isocyanates to compounds containing isocyanate-reactive hydrogen atoms is from 0.8:1 to 5:1; and an internal mold release agent comprising a mixture of salts which contain at least 25 carbon atoms of aliphatic carboxylic acids and esters, which contain COOH or OH or COOH and OH groups, of monofunctional carboxylic acids, polycarboxylic acids, or mono- and polyfunctional carboxylic acids.

2. A process according to claim 1, characterized in that three reaction mixtures are introduced into the closed mold, such that after the second reaction mixture has become resistant to permeation, but is still compressible, a third reaction mixture is introduced into the cavity, such that said third mixture surrounds the second mixture and compresses it, and said mixture is the same as or different from the second mixture and comprises isocyanates having isocyanate contents of from 5 to 50%, by weight; one or more compounds with molecular weights of from 32 to 10,000 which contain at least two isocyanate-reactive hydrogen atoms, such that the equivalent ratio of isocyanates to compounds containing isocyanate-reactive hydrogen atoms is from 0.8:1 to 5:1; and an internal mold release agent comprising a mixture of salts which contain at least 25 carbon atoms, of aliphatic carboxylic acids and esters, which contain COOH or OH or COOH and OH groups, of monofunctional carboxylic acids, polycarboxylic acids, or mono- and polyfunctional carboxylic acids.

3. A process according to claim 1 or 2, characterized in that the internal mold release agent of the second reaction mixture also includes amines containing amide, ester, or amide and ester groups.

4. A process according to claim 1 or 2, characterized in that the internal mold release agent of the second reaction mixture also includes amines containing amide, ester, or amide and ester groups and natural, synthetic or natural and synthetic oils, fats and waxes.

5. A process according to claim 2, characterized in that the internal mold release agent of the second reaction mixture also includes amines containing amide, ester or amide and ester groups.

6. A process according to claim 2, characterized in that the internal mold release agent of the second reaction mixture also includes amines containing amide, ester, or amide and ester groups and natural, synthetic or natural and synthetic oils, fats and waxes.

7. A process according to claim 1 or 2, characterized in that the first reaction mixture also includes conventional auxiliary agents and additives.

8. A process according to claim 1 or 2, characterized in that the second reaction mixture also includes conventional auxiliary agents and additives.

9. A process according to claim 2, characterized in that the third reaction mixture also includes conventionak auxiliary agents and additives.

10. A process according to claim 1 or 2, characterized in that the first reaction mixture also includes an internal mold release agent in the presence or absence of an external mold release agent.

11. A process according to claim 1 or 2, characterized in that the second reaction mixture is foamable and includes blowing agents.

12. A process according to claim 2, characterized in that the third reaction mixture is foamable and includes blowing agents.

13. A process according to claim 1 or 2, characterized in that the first reaction mixture comprises from 0.1 to 10%, by weight (based on the reaction mixture), of water, as a blowing agent.

* * * * *